United States Patent [19]
Takatori et al.

[11] Patent Number: 4,658,217
[45] Date of Patent: Apr. 14, 1987

[54] TIMING SIGNAL EXTRACTING CIRCUIT

[75] Inventors: Hiroshi Takatori, Kokubunji; Toshiro Suzuki, Tama; Keiji Tomooka, Yokohama, all of Japan

[73] Assignee: Hitachi, Ltd., Tokyo, Japan

[21] Appl. No.: 654,897

[22] Filed: Sep. 27, 1984

[30] Foreign Application Priority Data

Sep. 30, 1983 [JP] Japan ................... 58-180244

[51] Int. Cl.$^4$ ................... H03B 1/00; H03K 5/13; H03L 7/00
[52] U.S. Cl. ................... 328/139; 328/155; 328/109; 307/511; 331/25; 331/17
[58] Field of Search ................ 307/511, 518; 328/139, 328/109, 155; 331/1 A, 10, 17, 25

[56] References Cited
U.S. PATENT DOCUMENTS 3,609,560  9/1971  Greenburg ................. 307/518
4,257,007  3/1981  Brooks et al. ............. 328/155
4,495,473  1/1985  Treise ................... 328/155
4,517,531  5/1985  Tan et al. ............... 331/17

Primary Examiner—Stanley D. Miller
Assistant Examiner—Timothy P. Callahan
Attorney, Agent, or Firm—Antonelli, Terry & Wands

[57] ABSTRACT

A timing signal extraction circuit has a clock signal extractor for extracting from a transmitted data signal a clock component synchronous with the transmission rate of the transmitted signal, an oscillator having an oscillation frequency about M (M: an integer) times as high as the transmission rate of the transmitted signal, a phase-locked loop detecting the phase difference between the output signal of a frequency divider frequency-dividing the output signal of the oscillator and the output signal of the clock signal extractor thereby controlling the operating phase of the oscillator, and a logic circuit producing a plurality of pulse trains whose bit rate is equal to the transmission rate of the transmitted signal and which have respectively different phases. A pulse train having a desired phase is selected from among the plural pulse trains to provide a decision timing signal.

1 Claim, 9 Drawing Figures

TIMING SIGNAL EXTRACTING CIRCUIT

This invention relates to a timing signal extracting circuit, and more particularly to a circuit which is incorporated in a path of transmission of a data signal such as a PCM digital signal, so that a timing signal which has a frequency equal to the data transmission rate (the bit rate) of the data signal and whose phase has a predetermined relationship with that of the data signal can be extracted from the received data signal. More specifically, the present invention relates to a timing signal extracting circuit which is suitable for incorporation in a transmission path where the decision timing tends to greatly deviate from the proper timing due to, for example, an echo generated due to mismatching at the input and output terminals of the transmission path or impedance discontinuity in the transmission path.

In the transmission of a data signal, such as a PCM digital signal, a timing signal synchronized with the transmission rate (the bit rate) and phase of the transmitted pulse signal is required for the regeneration of the pulse signal received by a repeater or a receiver. For this purpose, in a prior art timing signal extracting circuit, the received data signal (passed through an equalizer) is subjected to full-wave rectification, and the rectified signal is passed through a narrow-band filter, for example, an LC tank circuit tuned to the frequency of the transmitted signal (the data signal) to extract the fundamental frequency component of the transmitted signal, this extracted fundamental frequency component being then converted into a clock signal syncronized with the transmission rate of the transmitted signal. In the meantime, a clock signal generated from a voltage controlled oscillator (VCO) having a center frequency of oscillation which is n (n: an integer) times as high as the fundamental frequency of the transmitted signal is frequency-divided to obtain a clock signal having a frequency approximately equal to the transmission rate of the transmitted signal. The desired timing signal is extracted from the transmitted signal by means of a so-called phase-locked loop in which the phase of the latter clock signal is compared with that of the former clock signal, and the resultant difference signal is passed through a low-pass filter for controlling the frequency and phase of the output signal of the VCO.

The timing signal so extracted is used for identifying or discriminating the pulse signal at the repeater or receiver. However, the relationship between the phase of the extracted timing signal and that of the received pulse signal is not always optimum for various reasons even when the frequency of the extracted timing signal is equal to the fundamental frequency of the received pulse signal.

In order to attain the desired optimum phase relationship between these signals, a phase controller is commonly provided at the output of the tank circuit described above, so that a timing error attributable to, for example, errors which occur in the components or a variation of the characteristic of the transmission path from the normal characteristic can be compensated and absorbed. This phase controller generally comprises a phase shifter including a variable capacitive element. A random-pattern test signal superposed with a crosstalk noise or the like is applied to the input terminal of the phase shifter, and the variable capacitive element is suitably adjusted so as to minimize the timing jitter or the error rate.

However, the operation of such a phase controller involves various problems as will be described now.

In a phase controller of the simple type used hitherto, its phase controllable range is narrow or only about from $-30°$ to $+30°$ with respect to the bit rate. Therefore, the phase controller is unable to sufficiently control the phase when a wide range of phase control is required in a transmission system where a remarkable echo appears in a transmitted signal as will be described later.

The second problem is the lack of versatility with respect to the frequency of a transmitted signal. More precisely, since the controllable range of phase of the prior art phase controller is dependent upon a delay time inherently determined by the variable capacitance element, the controllable range of phase is reduced to, for example, $\frac{1}{2}$ when the fundamental frequency of the transmitted signal becomes $\frac{1}{2}$.

The third problem is that a variation of the characteristic of the variable capacitance element due to the aging effect tends to cause a corresponding deviation of the timing.

It is therefore an object of the present invention to provide a timing regenerating circuit in which all of the problems confronted by the prior art are solved, that is, to provide a timing signal extracting circuit whose phase variation range is maintained constant regardless of variations of the frequency of a transmitted signal and is as wide as from $-180°$ to $+180°$ and which is free from any variation due to the aging effect.

The present invention, which attains the above object without using the phase controller including the variable capacitive element provided at the output of the tank circuit, operates to generate a plurality of clock signals (internal clock signals) having respectively different frequencies are generated in a phase-locked loop (PLL), which clock signals are combined and logically processed to obtain a timing signal whose phase has any desired relationship with that of the transmitted signal.

In the timing signal extracting circuit of the present invention, these internal clock signals are combined and logically processed so as to extract a timing signal which has any desired frequency and whose phase has any desired relationship with that of the transmitted signal. According to a preferred mode described later with reference to an embodiment of the present invention, a plurality of clock signals are generated which have a minimum phase difference of $360°/M$ (M: an integer) and whose phase variation range is from $-180°$ to $+180°$. Any desired one of these clock signals is selected in response to the application of an external signal for the purpose of phase control.

When the transmission system further includes an equalizer of the decision feedback type, any intersymbol interference that appears before a decision timing signal is detected so that the timing signal can be automatically set at a decision phase which will minimize the intersymbol interference.

The timing signal extracting circuit of the present invention can operate without any deviation of the decision timing due to the aging effect and maintains the function of stably effecting the phase control over a wide phase variation range since the phase of the clock signal is locked in relation to the frequency by the PLL.

Further, in the transmission system in which the equalizer of the decision feedback type is used for removing the echo, an undesirable degradation of the characteristic due to the intersymbol interference can be greatly reduced.

The above-mentioned and other features and objects of the present invention will become more apparent by reference to the following description taken in conjunction with the accompanying drawings, in which:

FIG. 1 shows an embodiment of the timing signal extracting circuit according to the present invention, and more particularly an embodiment in which an extracted timing signal is utilized as a decision timing signal.

Figure 1:
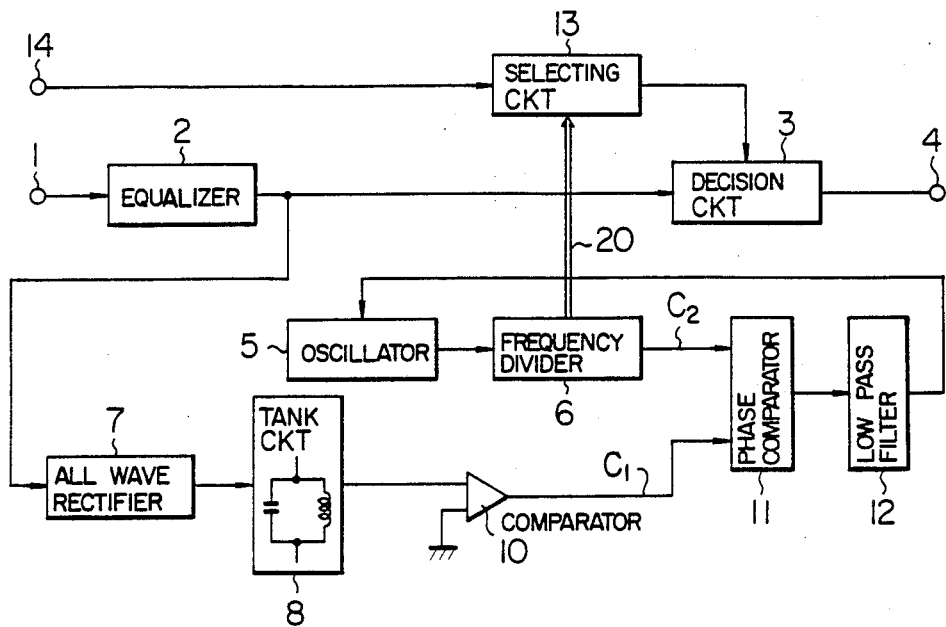
FIG. 1 is a block diagram showing the structure of an embodiment of the timing signal extracting circuit according to the present invention.

Referring to FIG. 1, a pulse signal received at an input terminal 1 is applied to a decision circuit 3 through a $\sqrt{f}$ equalizer 2. In the decision circuit 3, the level of the received pulse signal is determined in response to the application of a timing signal of desired phase obtained from the timing signal extracting circuit which will now be described.

A portion of the output signal of the $\sqrt{f}$ equalizer 2 is rectified by a full-wave rectifier 7, and the output signal of the rectifier 7 is applied to a narrow-band filter 8, such as a tank circuit tuned to the transmission rate (the fundamental frequency f) of the transmitted pulse signal, to be converted into a sinusoidal wave signal synchronized with the transmission rate (the bit rate). This sinusoidal wave signal is applied directly to a comparator 10 which generates a first clock signal C1 which is synchronous with the zero cross time of the sinusoidal wave signal.

On the other hand, the output signal of an oscillator 5 whose oscillation frequency is about M (M: integer) times the fundamental frequency f of the transmitted pulse signal is frequency-divided by the factor of M by a frequency divider 6 which generates a second clock signal C2. The first and second clock signals C1 and C2 are applied to a phase comparator 11, and the comparator output signal indicative of the phase difference is applied through a low-pass filter 12, which removes high-frequency jitters, to the oscillator 5 as a control signal for controlling the oscillation frequency and phase of the oscillator 5. Thus, the blocks 5-6-11-12-5 constitute a phase-locked loop (PLL).

In response to the application of an external signal through an external signal input terminal 14, a logic circuit 13, which is a selecting circuit, selects any desired one of timing signals having a phase difference of 360°/M from each other. The selected timing signal is applied from the logic circuit 13 to the decision circuit 3 as decision timing to discriminate the pulse from the equalizer 2.

Figure 2:
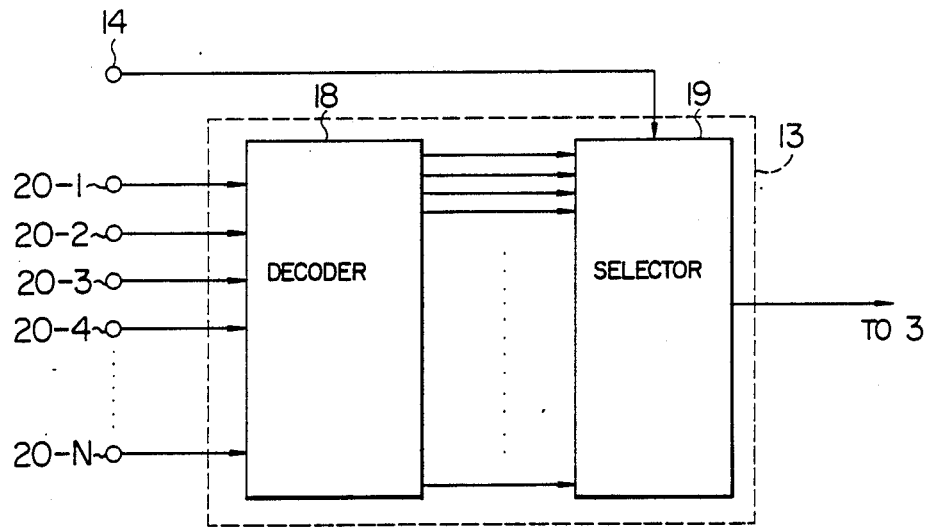
FIG. 2 is a block diagram showing the structure of one form of the logic circuit 13 shown in FIG. 1.

FIG. 2 shows the structure of one form of the logic circuit 13. Clock signals having frequencies which are obtained by dividing the frequency of the output signal of the frequency divider 6 by factors of 1 (i.e., the same frequency), 2, 4, ..., $2^N$ are applied to the input terminals 20-1, 20-2, 20-3, ..., 20-N, respectively. In an N-$2^N$ decoder 18, the plural clock signals applied to the respective input terminals 20-1 to 20-N are logically combined and processed to be converted into M clock signals which have a phase difference of 360°/M (M: integer) from each other and whose frequency is equal to that of the transmission signal or the output of frequency divider 6. Such M clock signals are applied to a selector 19. In response to the phase selection control signal applied to the external signal input terminal 14, the selector 19 selects the clock signal of specified phase from among the M clock signals and applies the selected clock signal to the decision circuit 3 through its output terminal to the decision circuit 3.

Figure 3:
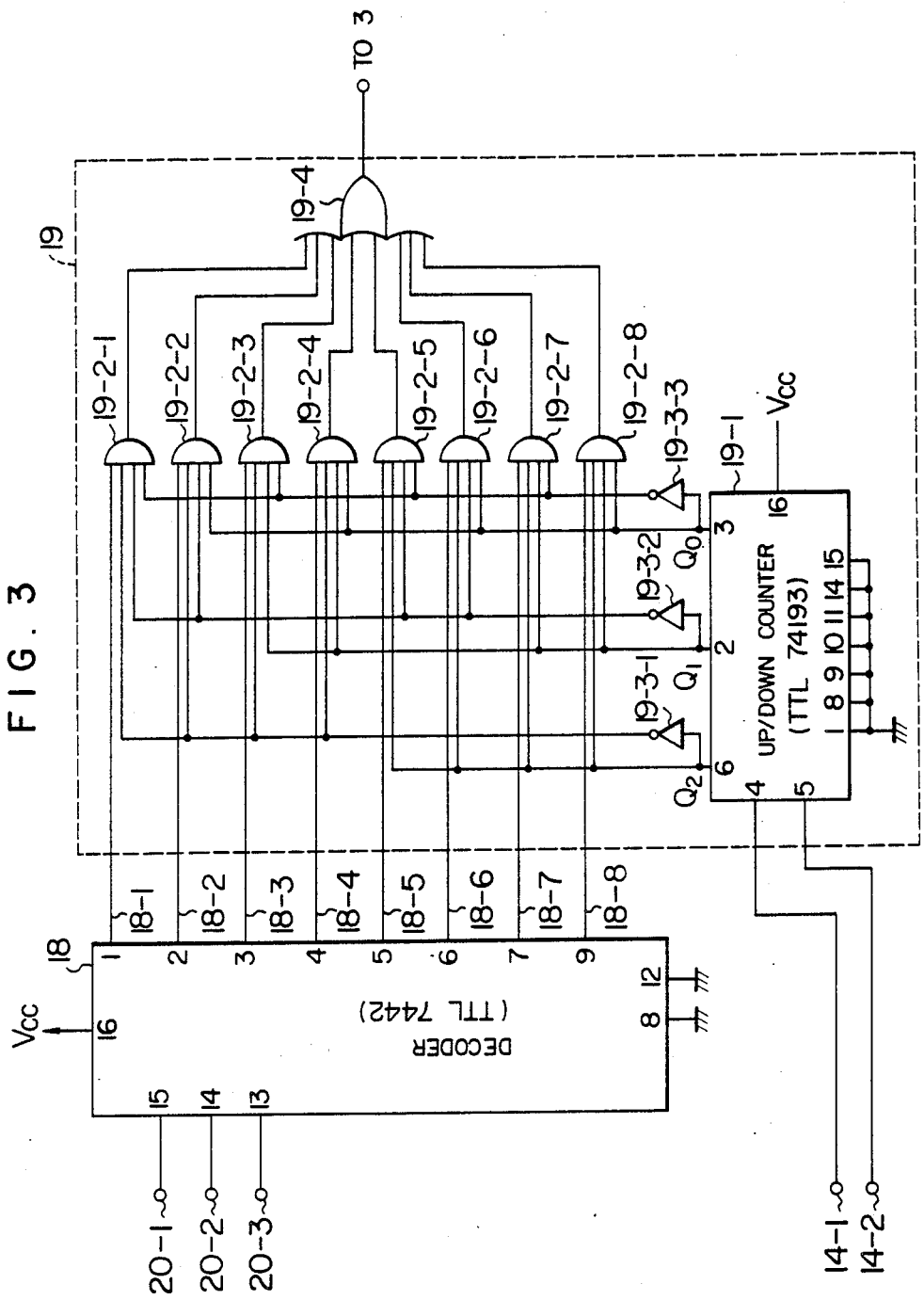
FIG. 3 is a circuit diagram of the logic circuit 13 shown in FIG. 2.

FIG. 3 shows, by way of example, a preferred circuit diagram of the logic circuit 13 shown in FIG. 2. In the example shown in FIG. 3, M is 8.

Referring to FIG. 3, the decoder 18 is that sold under the trade name of TTL 7442. Clock signals having frequencies obtained by dividing the frequency of the output signal of the oscillator 5 by factors of 1 (i.e., the same frequency), 2 and 4 are applied to input terminals 20-1, 20-2 and 20-3, respectively. Output signals whose period is equal to that of the clock signal applied to the input terminal 20-3 and which have a phase difference of 360°/8 from each other appear at output terminals 18-1, 18-2, ..., 18-8, respectively of the decoder 18. The selector 19 includes the combination of an up-down counter 19-1 (sold under the trade name of TTL 7 4193), AND gates 19-2-1, 19-2-2, ..., 19-2-8, inverters 19-3-1, 19-3-2, 19-3-3, and an OR gate 19-4 for logically summing the outputs of all the AND gates 19-2. The output of the up-down counter 19-1 triggers the AND gates for selecting one of the timing signals 18-1 to 18-8 which are generated from the decoder 18 and which have the phase difference of 360°/8 from each other. The external signal is applied to input terminals 14-1 and 14-2 of the up-down counter 19-1 to control the counter 19-1.

Figure 4:
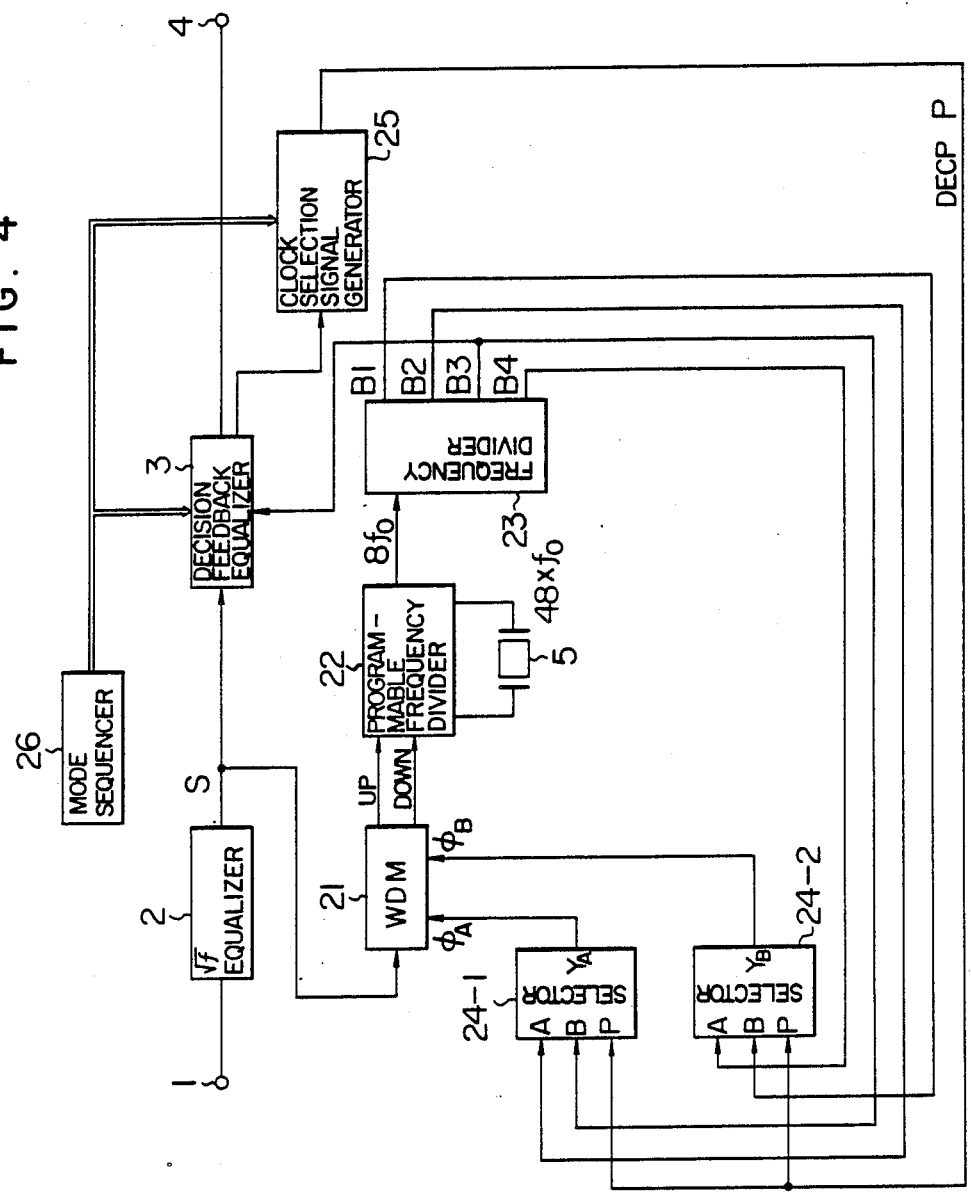
FIG. 4 is a block diagram showing the structure of another embodiment of the timing signal extracting circuit according to the present invention.

FIG. 4 is a block diagram showing the structure of another embodiment of the timing signal extracting circuit according to the present invention. In the embodiment shown in FIG. 4, a decision feedback type equalizer is used as the decision circuit 3, and a phase detector 21 using a wave difference method (abbreviated hereinafter as a WDM) is used to constitute the PLL. In this embodiment, the output signal of the decision feedback type equalizer 3 is used to automatically select a timing signal of optimum phase from among a plurality of timing signals generated from the PLL, so as to provide a decision timing signal.

Referring to FIG. 4, a transmitted pulse signal is applied through the input terminal 1 to a $\sqrt{f}$ equalizer to derive a signal S. A portion of the signal S is applied to the decision feedback type equalizer 3, while another portion of the signal S is applied to the WDM 21 in the PLL.

Figure 5:
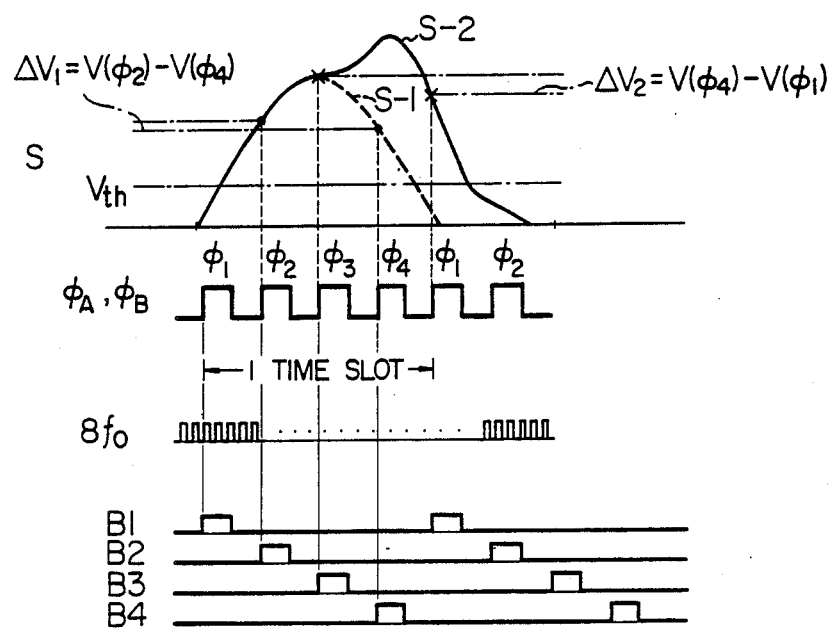
FIG. 5 is a waveform diagram for illustrating the operation of the embodiment shown in FIG. 4.

In the WDM 21, the voltage difference $\Delta V = V(\phi_A) - V(\phi_B)$ between two voltages $V(\phi_A)$ and $V(\phi_B)$ two different times $\phi_A$ and $\phi_B$ is detected. On the basis of the magnitude of the detected voltage difference ΔV, the WDM 21 generates an up pulse and a down pulse for advancing and delaying the phases of the timing pulses $\phi_A$ and $\phi_B$. The structure of this WDM 21 is already commonly known and is disclosed in, for example, IEEE TRANSACTIONS, VOL. COM-30, No. 9, SEPT. 1982, p. 2078 "Timing Extraction PLL". Therefore, any detailed description of the practical structure thereof is unnecessary. Suppose, for example, that $\phi_A = \phi_2$ and $\phi_B = \phi_4$ when the input signal S has a waveform S-1 as shown in FIG. 5. Then, the voltage difference $\Delta V = V(\phi_A) - V(\phi_B)$ is quite small, and the phase at times $\phi_A$ and $\phi_B$ is stabilized. In this case, the timing signal is generated at time $\phi_3$. However, when the input signal S has a waveform S-2 as shown in FIG. 5 due to addition of an echo or like noise, the voltage difference ΔV becomes small when $\phi_A = \phi_3$ and $\phi_B = \phi_1$. In such a case, an erroneous decision will be made such that $\phi_4$ is the phase of timing signal generation.

Referring to FIG. 4 again, the up or down pulse from the WDM 21 is applied to a programmable frequency divider 22. The output signal of an oscillator 5 having an oscillation frequency of 9.6 MHz ($=48 \times f_o$) is frequency-divided by the factor of 6 by the frequency divider 22. Therefore, the frequency divider 22 generates an output pulse signal having a frequency of 1.6 MHz ($=8f_o$). (The frequency divider 22 generates one pulse each time it counts six pulses of 9.6 MHz.) However, only when the up pulse is applied thereto, the frequency divider 22 generates one pulse when it counts seven pulses of 9.6 MHz. On the other hand, in response to the application of the down pulse, the frequency divider 22 generates one pulse when it counts 5 pulses of 9.6 MHz. That is, the phase is jumped in response to the application of the up/down pulse, and this frequency divider 22 is the same one as that commonly incorporated in a digital phase-locked loop.

The output signal (whose frequency is $8f_o$) of the frequency divider 22 is applied to another frequency divider 23 which divides the frequency by a factor of 8, and the input signal is converted into four clock signals $B_1$, $B_2$, $B_3$ and $B_4$ whose frequency is 200 kHz ($=f_o$) and which have a phase difference of 360°/4 from each other. The clock signal $B_1$ is applied to an input B of a selector 24-2; the clock signal $B_2$ is applied to an input A of a selector 24-1; the clock signal $B_3$ is applied to another input B of the selector 24-1; and the clock signal $B_4$ is applied to another input A of the selector 24-2. The clock signal $B_3$ is also applied to the decision feedback type equalizer 3 as a decision timing signal.

In response to the application of a clock selection signal DECP (described later), the selectors 24-1 and 24-2 generate an output signal $Y_A$ or $Y_B$ satisfying the following relation:

$$Y = P \cdot B + \overline{P} \cdot A$$

where P designates the signal DECP. Therefore, the two timing signals $\phi_A$ and $\phi_B$ applied to the WDM 21 are as follows:

$\phi_A = B_2$ and $\phi_B = B_4$ when P = "0", and
$\phi_A = B_1$ and $\phi_B = B_3$ when P = "1".

Thus, when the signal P = DECP = "1", the decision timing signal acts to cause a 90°-jump of the phase forward.

Figure 6:
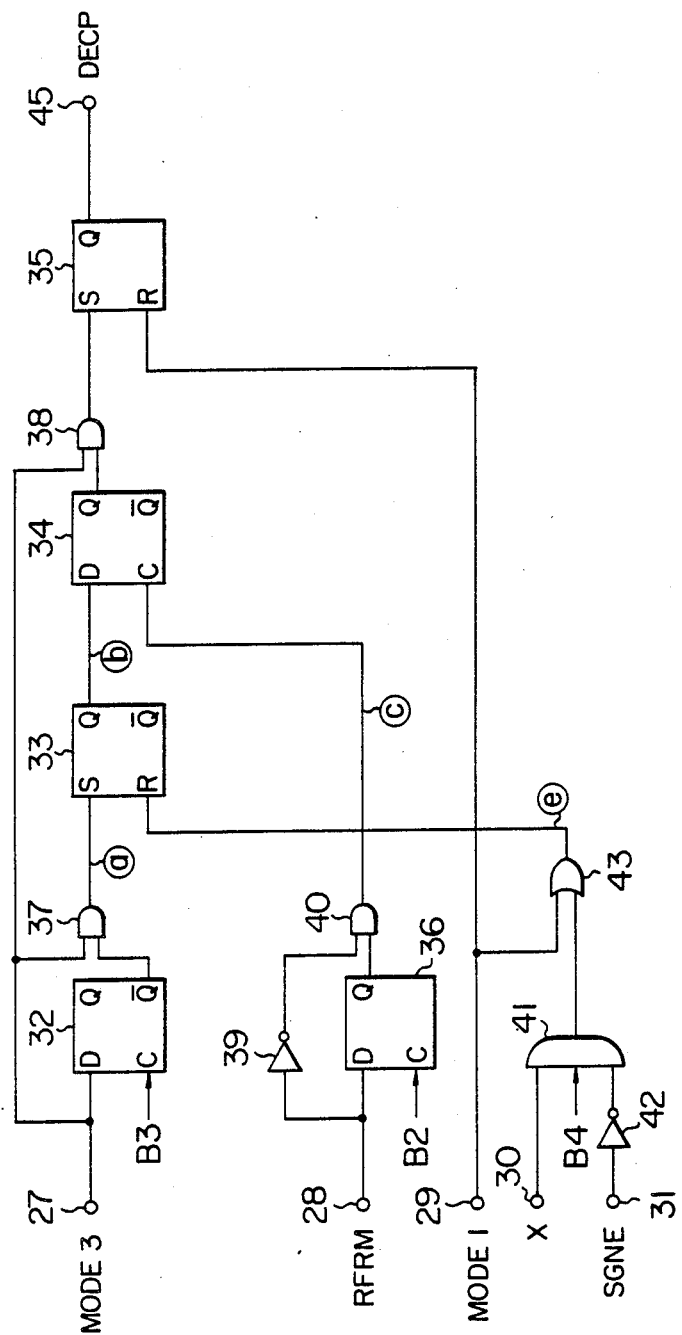
FIG. 6 is a circuit diagram showing the structure of one form of the block 25 shown in FIG. 4.

FIG. 6 is a circuit diagram showing the structure of a logic circuit 25 shown in FIG. 4. This logic circuit 25 is a clock selection signal generator for generating the clock selection signal DECP applied to the selectors 24-1 and 24-2 connected to the WDM 21 in FIG. 4.

Figure 7:
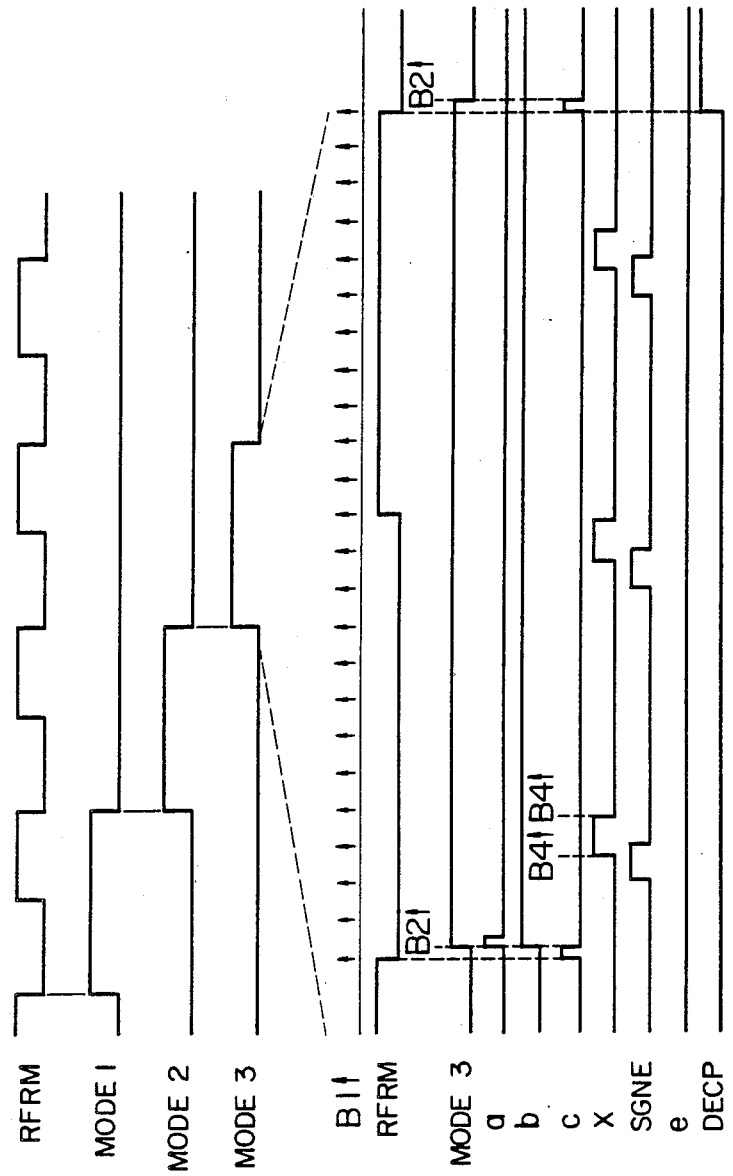
FIG. 7 is a timing chart for illustrating the operation of the circuit shown in FIG. 6.

Referring to FIG. 6, signals MODE3, RFRM and MODE1 shown in FIG. 7 are applied from a mode sequencer 26 shown in FIG. 4 to input terminals 27, 28 and 29, respectively, of the logic circuit 25. The mode sequencer 26 is a circuit which controls the initial training of the decision feedback type equalizer 3 described later and generates the signal RFRM and signals MODE1, MODE2 and MODE3 shown in FIG. 7. The logic circuit 25 is reset when the signal MODE1 of "1" level is applied thereto. The signal MODE2 provides such a mode that a timing signal between the clock signals $\phi_A$ and $\phi_B$ applied to the WDM 21 is selected as the decision timing signal. Therefore, when, for example, the clock signal $\phi_A = B_2$ and the clock signal $\phi_B = B_4$, the signal $B_3$ is selected as the decision timing signal. Thus, the decision timing signal $B_3$ appears at or coincides with the position where the signal waveform S has its maximum amplitude as shown in FIG. 5.

When the signal MODE3 of "1" level is applied to the input terminal 27, the presence or absence of an intersymbol interference that occurs before the main pulse (the level of the waveform 360° before the main pulse) is checked. When the intersymbol interference is present and proved to be less than a predetermined setting Vth (of, for example, 100 mV), the clock selection signal DECP of "0" level appears at an output terminal 45, and the operation similar to that described above with regard to the mode provided by the signal MODE2 is effected. On the other hand, when the intersymbol interference has a level exceeding the predetermined setting, the signal DECP is turned into its "1" level, and the decision phase is set at a 90°-advanced position.

The operation of the logic circuit 25 will be described in further detail with reference to FIGS. 6 and 7.

When the signal MODE1 is in its "1" level, the signal MODE3 is in its "0" level. In this case, the signal DECP appearing at the output terminal 45 is in its "0" level since a "1" is applied to the reset terminal of a set-reset flip-flop 35.

When the signal MODE2 is in its "1" level, both the signals MODE1 and MODE3 are in their "0" level. In this case, the signal DECP appearing at the output terminal 45 is in its "0" level since a "0" is applied to the set terminal of the S-R flip-flop 35 from the input terminal 27 through an AND gate 38.

When the signal MODE3 is in its "1" level, both the signals MODE1 and MODE2 are in their "0" level. In this case, a signal ⓐ of "1" level indicative of the start of the mode provided by the signal MODE3 appears from an AND gate 37 connected to a D flip-flop 32 to set an S-R flip-flop 33, and an output signal ⓑ of "1" level appears from the S-R flip-flop 33. This signal ⓑ remains in its "1" level unless a reset signal is applied to the S-R flip-flop 33. The signal RFRM is applied to a D flip-flop 36 and also to an AND gate 40 through an inverter 39, and a pulse $B_2$ is applied as a clock input to the D flip-flop 36. An output signal ⓒ indicative of the end of the mode provided by the signal MODE3 appears from the AND gate 40. This signal ⓒ is applied to the clock terminal of a D flip-flop 34, thereby setting the state of the signal ⓑ in the S-R flip-flop 35.

An AND gate 41 is a circuit which discriminates whether or not an intersymbol interference is present. When the result of discrimination proves that an intersymbol interference (of, for example, more than 100 mV) appears even once during the period of the mode provided by the signal MODE3, an output signal ⓔ of an OR gate 43 resets the S-R flip-flop 33.

Applied to the AND gate 41 are a positive-polarity signal X, a pulse B4 and an output signal of an inverter 42 which inverts the output signal SGNE of the decision feedback type equalizer 3 indicative of the result of discrimination of the presence or absence of the intersymbol interference. The signals X and SGNE are applied to input terminals 30 and 31, respectively. The output signal of this AND gate 41 is applied to the OR gate 43 to appear as the signal ⓔ. Therefore, when the intersymbol interference is present, the signal DECP of "1" level appears at the output terminal 45, while when the interference is absent, the signal DECP of "0" level appears at the output terminal 45.

Figure 8:
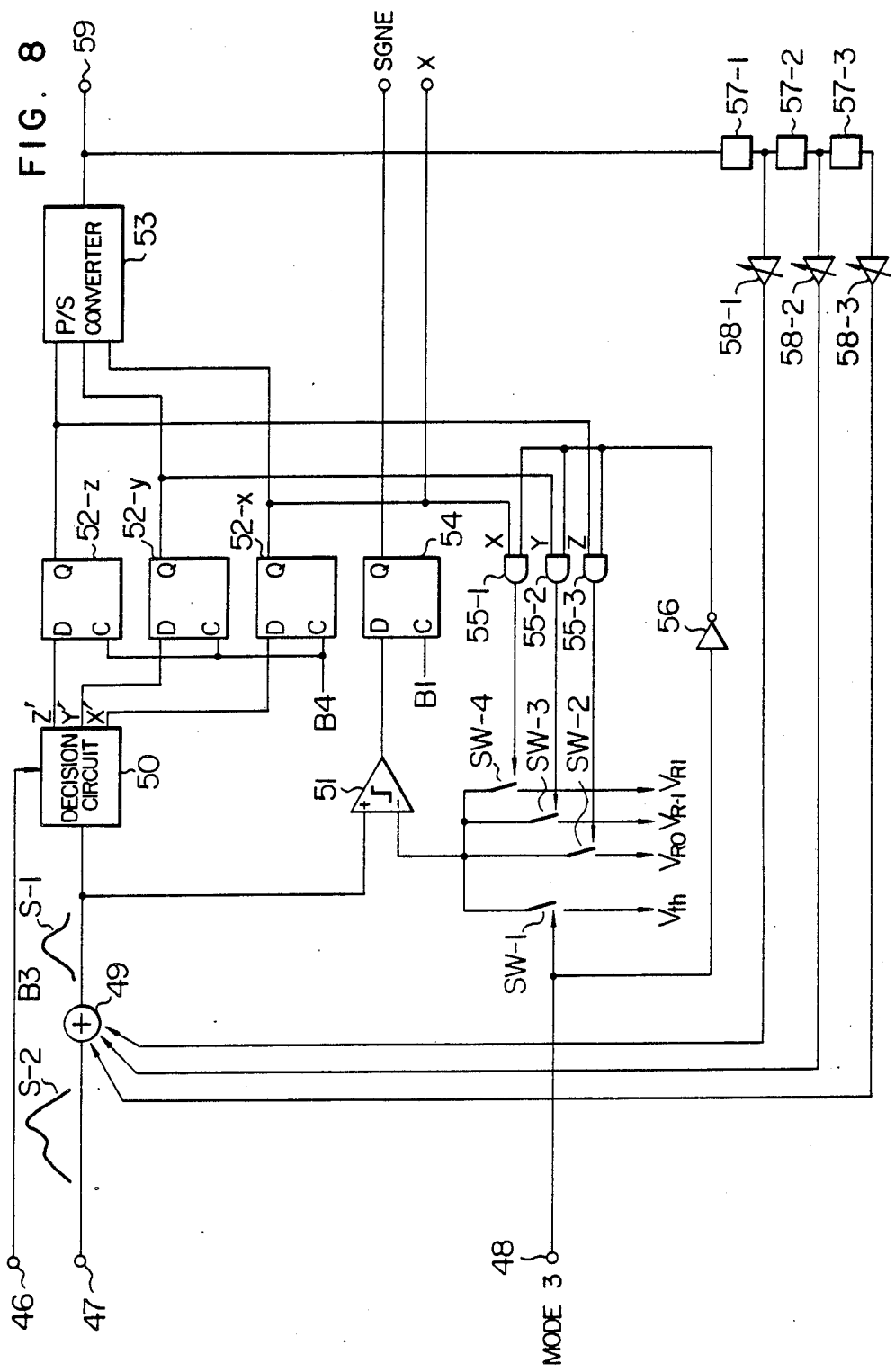
FIG. 8 is a circuit diagram showing the structure of the decision feedback type equalizer 3 shown in FIG. 4.

FIG. 8 is a circuit diagram showing the structure of one form of the decision feedback type equalizer 3 shown in FIG. 4.

Referring to FIG. 8, the timing pulse signal $B_3$ which is one of the output signals of the frequency divider 23, the output signal S of the $\sqrt{f}$ equalizer 2 and the signal MODE3 which is one of the output signals of the mode sequencer 26 shown in FIG. 4 are applied to input terminals 46, 47 and 48 respectively of the decision feedback type equalizer 3. The decision feedback type equlizer 3 includes an adder 49, a decision circuit 50, flip-flops 52-X, 52-Y and 52-Z, a parallel-serial converter 53, delay elements 57-1, 57-2, 57-3 and coefficient circuits 58-1, 58-2, 58-3, all of which are the same as those included in a known equalizer of this type.

An input signal S-2 including distortion components such as an echo and the like is applied through the input terminal 47 to the adder 49, and distortion components produced by the combination of the delay elements 57 and the coefficient circuits 58 are subtracted in the adder 49 from the input signal S-2 to provide a distortion-free signal S-1. In the decision circuit 50, the signal S-1 is subjected to a decision with the timing of the decision timing signal appearing from the timing signal extracting circuit. More precisely, when the signal S-1 is of a bipolar code, whether the code represents +1, 0 or −1 is discriminated. The values +1, 0 or −1 are delivered as parallel signals x', y' and z', respectively, and, the discriminated signals x', y' and z' , are converted into signals x, y and z having the timing of the timing signal B4 through D-flip-flops 52-x, 52-y and 53-y, respectively. The parallel signals x, y and z are applied to the parallel-serial converter 53 to appear at an output terminal 59 as a regenerated signal which has been subjected to the decision. Further, the output signal S-1 of the adder 49 is compared in a comparator 51 with a reference voltage $V_{R0}$ (0 volt) , $V_{R-1}$ (−1 volt) or $V_R$ (+1 volt), and the output signal of the comparator 51 is sampled in a flip-flop 54 at the timing of the pulse signal $B_1$. Then, the resultant output signal SGNE of the flip-flop 54 is applied to a coefficient control circuit (not shown) to provide a control signal for controlling the coefficient circuits 58.

The equalizer 3 includes AND gates 55-1, 55-2 and 55-3 since the input signal S-1 is a bipolar code signal. These AND gates 55-1, 55-2 and 55-3 generate signals actuating switches SW-4, SW-3 and SW-2, respectively, so as to select the reference voltages $V_{R1}$, $V_{R0}$ and $V_{R-1}$ corresponding to the signals +1 (=X), 0 (=Y) and −1 (=Z), respectively.

Now, when the signal MODE3 of "1" level (FIG. 7) is generated from the mode sequencer 26 and is applied to the input terminal 48 in FIG. 8, a switch SW-1 is turned on to turn off the AND gates 55-1, 55-2 and 55-3 through an inverter 56. Consequently, the signal SGNE generated from the flip-flop 54 is indicative of whether or not an intersymbol interference is present, that is, indicative of whether or not the signal voltage appearing during the period of generation of the pulses $B_1$ is higher than the setting Vth. This signal SGNE and the bipolar signal X are applied to the respective input terminals 31 and 30 in FIG. 6 so that the logic circuit 25 performs the operation described hereinbefore.

The embodiment of the present invention has been described with reference to the case where a plurality of pulse trains $B_1$, $B_2$, $B_3$ and $B_4$ having a phase difference of 360°/4 from each other are produced in the phase-locked loop. However, the present invention is in no way limited to such a specific embodiment, and M pulse trains having a phase difference of 360°/M from each other can be generally used to attain the object.

Figure 9:
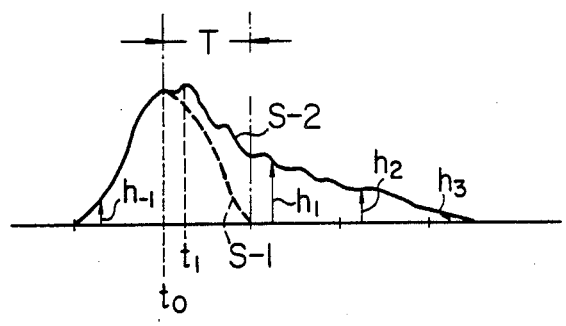
FIG. 9 is a waveform diagram illustrating an impulse response in the presence of an intersymbol interference.

When the impulse response of the transmission path is greatly affected by echo components as shown in FIG. 9, the timing provided by the conventional tank circuit 8 is displaced to $t_1$ which is rear relative to the primarily desired timing $t_0$. This timing displacement ($t_1-t_0$) is frequently more than 90°, and the prior art timing signal extracting circuit is unable to provide the desired decision timing signal under such a situation. In contrast, in the timing signal extracting circuit according to the present invention, the decision phase can be freely controlled between +180° and −180° as described already. Therefore, the present invention provides means especially preferable for waveform equalization of a signal including remarkable echoes.

FIG. 9 shows that intersymbol interference components $h_{-1}$, $h_1$, $h_2$ and $h_3$ appear in the signal waveform S-2. The decision feedback type equalizer 3 employed in the embodiment of the present invention is defective in that the interference component $h_{-1}$ appearing before the decision timing cannot be compensated, although the interference components $h_1$, $h_2$ and $h_3$ appearing after the decision timing can be completely equalized. However, by sufficiently phase-shifting the decision timing forward as described with reference to the embodiment of the timing signal extracting circuit according to the present invention, the interference component $h_{-1}$ can be minimized, and the characteristic of the decision feedback type equalizer can also be improved.

I claim:
1. A timing signal extracting circuit for producing a decision timing signal to be applied to a decision feedback type equalizer, comprising:
a phase detector operating in accordance with a wave difference method, including means for extracting two amplitude values from a transmitted signal sampled by two clock signals having phases which are different by a half of the period of the transmitted signal, and means for generating an output signal indicative of the difference between the two amplitude values;
an oscillator having an oscillation frequency M (M: an integer) times as high as the transmission rate of the transmitted signal;
programmable frequency divider means connected to said oscillator and said phase detector for dividing the frequency of the output signal of said oscillator so as to generate a frequency-divided clock signal and for controlling the phase of said frequency-divided clock signal on the basis of said output signal of said phase detector;

first logic circuit means for further dividing the frequency of the output signal of said programmable frequency divider so as to generate a plurality of pulse trains whose frequency is equal to that of said transmitted signal and which have respectively different phases;

means for applying one of said plurality of pulse trains to said decision feedback type equalizer as the decision timing signal;

second logic circuit means for selecting two pulse trains from among said plurality of pulse trains and for providing said two pulse trains to said phase detector as said two clock signals of different phase; and clock selection signal generator means for controlling said second logic circuit means by use of a signal from said decision feedback type equalizer and an external control signal.

* * * * *